No. 627,225. Patented June 20, 1899.
W. J. EIFLER.
LUGGAGE CARRIER.
(Application filed Apr. 25, 1899.)
(No Model.)
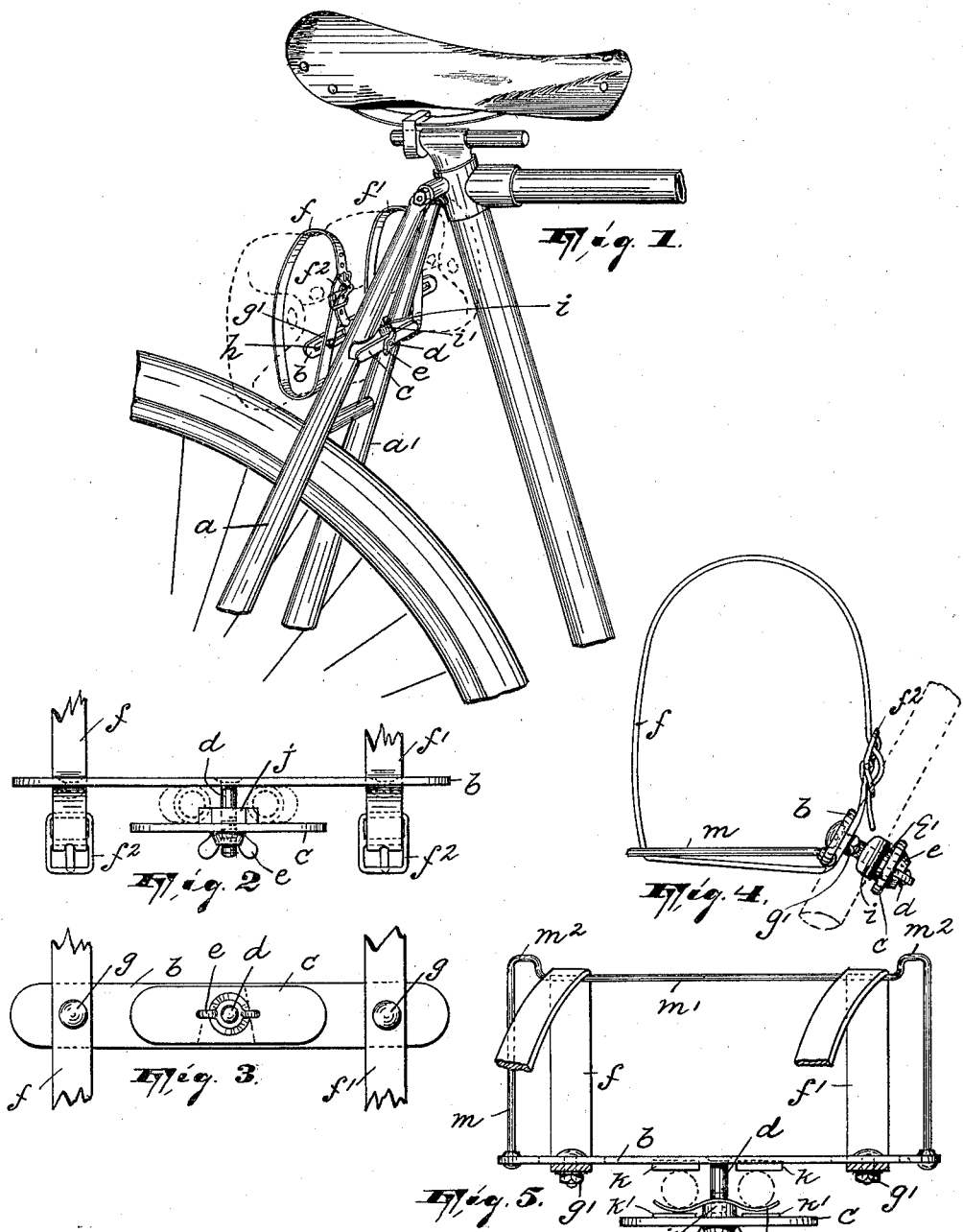
WITNESSES:
Wm D. Bell
Robert J. Pollitt
INVENTOR,
William J. Eifler,
BY
Gartner & Stewards
ATTORNEYS.

UNITED STATES PATENT OFFICE.

WILLIAM J. EIFLER, OF PATERSON, NEW JERSEY.

LUGGAGE-CARRIER.

SPECIFICATION forming part of Letters Patent No. 627,225, dated June 20, 1899.

Application filed April 25, 1899. Serial No. 714,346. (No model.)

*To all whom it may concern:*

Be it known that I, WILLIAM J. EIFLER, a citizen of the United States, residing in Paterson, in the county of Passaic and State of New Jersey, have invented certain new and useful Improvements in Luggage-Carriers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to luggage-carriers for bicycles or other similar vehicles; and its object is to provide a luggage-carrier of simple, inexpensive, and durable construction and one which can be readily attached to and detached from the frame of the bicycle.

The invention consists in the improved luggage-carrier and in the combination and arrangement of its various parts, substantially as will be hereinafter fully disclosed and finally embodied in the clauses of the claim.

In the accompanying drawings, wherein corresponding letters of reference are employed to designate like parts in the several views, Figure 1 is a perspective view of a portion of a bicycle and my improved luggage-carrier mounted on a portion of the frame thereof. Figs. 2 and 3 are enlarged top and front views of a certain modification of the invention, and Figs. 4 and 5 are enlarged side and top views of a certain other modification of said invention.

In said drawings, $a$ $a'$ designate the rear forks of the bicycle-frame. By preference my improved luggage-carrier is secured to these forks.

The luggage-carrier consists, essentially, of a pair of plates $b$ $c$, which are secured together and clamped upon said forks by a suitable bolt $d$, provided with a wing-nut $e$, one of said plates being adapted to sustain the luggage-carrying means proper. Said luggage-carrying means proper preferably consists of a pair of straps $f$ $f'$, having buckles $f^2$ and being secured to the plate $b$ by rivets $g$. (Shown in Figs. 2 and 3.) In order that various lengths of parcels may be accommodated, the plate $b$ is provided with longitudinal slots $h$, and instead of employing rivets I use bolts $g'$, which penetrate said slots and the strap and may be moved in the former to any desired position.

$i$ denotes a metallic spring-plate which I insert between a bushing $i'$, integrally formed on the plate $c$ and penetrated by the bolt $d$, and the forks $a$ $a'$, the ends of said plate being curved so as to approximately conform to the shape of the forks. Said plate is adapted not only to prevent an undue rattling of the parts, but it serves as a temporary means for sustaining the device in place, when the wing-nut has been screwed up sufficiently, until the operator is prepared to permanently clamp the device in a selected position.

In Figs. 2 and 3 a wedge-shaped block $j$ is formed midway upon the inner face of the plate $c$, its function being somewhat similar to that of the spring-plate $i$—that is to say, being adapted to approximately fit between the forks $a$ $a'$ of the frame of the bicycle it acts to hold the plate $c$ against turning and substantially true and steady until the two plates can be clamped in position.

In Figs. 4 and 5 I have shown a device substantially similar to that illustrated in Fig. 1, with the exception that, besides the spring-plate $i$, pairs of elastic-rubber buffers $k$ $k'$ are provided, being secured to the plates, one of said pairs of buffers being disposed between the spring-plate and the plate $c$ and the other pair being secured upon the adjoining face of the plate $b$ and opposite to the first-named pair. These buffers coact with the spring-plate $i$ to prevent a rattling of the parts. Furthermore, I show in these figures a substantially rectangular frame consisting of a wire rod $m$, having its ends riveted to and near the ends of the plate $b$. A portion of the side $m'$ of the frame which is opposite the plate $b$ is bent inwardly, so as to form projections $m^2$ at each of its ends adapted to prevent the straps $c$ from being displaced.

Having thus fully described my invention, what I claim as new, and desire to secure by Letters Patent, is—

1. A luggage-carrier comprising a pair of parallel plates, a bolt penetrating said plates and adapted to clamp the same to a portion of the bicycle-frame, straps secured to one of said plates, and means, independent of said bolt, for securing one of said plates in an operative position relatively to the frame, substantially as described.

2. A luggage-carrier comprising a pair of parallel plates, a bolt penetrating said plates and adapted to clamp the same to a portion of the bicycle-frame, straps secured to one of said plates, antirattling devices disposed between said plates, and means, independent of said bolt, for securing one of said plates in an operative position relatively to the frame, substantially as described.

In testimony that I claim the foregoing I have hereunto set my hand this 17th day of April, 1899.

WILLIAM J. EIFLER.

Witnesses:
JOHN W. STEWARD,
ALFRED GARTNER.